United States Patent
Luthra et al.

(12)

(10) Patent No.: US 6,434,195 B1
(45) Date of Patent: Aug. 13, 2002

(54) SPLICING OF VIDEO DATA IN PROGRESSIVELY REFRESHED VIDEO STREAMS

(75) Inventors: Ajay Luthra, San Diego; Keith J. Kelley, Olivenhain; Limin Wang, San Diego, all of CA (US)

(73) Assignee: General Instrument Corporaiton, Horsham, PA (US)

( * ) Notice: Subject to any disclaimer, the term of this patent is extended or adjusted under 35 U.S.C. 154(b) by 0 days.

(21) Appl. No.: 09/196,709

(22) Filed: Nov. 20, 1998

(51) Int. Cl.[7] .................................................. H04N 7/12
(52) U.S. Cl. ............................... 375/240.12; 375/240.12
(58) Field of Search ......................... 386/52, 55; 348/1, 348/2, 6, 9, 10, 12, 13; 455/5.1, 2, 3.1, 3.2; 375/240.12, 240.13; H04N 7/12

(56) References Cited

U.S. PATENT DOCUMENTS

| | | | |
|---|---|---|---|
| 5,057,916 A | | 10/1991 | Krause et al. |
| 5,732,183 A | * | 3/1998 | Sugiyama ........................ 386/4 |
| 6,029,045 A | * | 2/2000 | Picco et al. .................... 455/5.1 |
| 6,046,971 A | * | 4/2000 | Ogasawara .................. 369/124 |
| 6,167,084 A | * | 12/2000 | Wang et al. ............ 375/240.02 |

FOREIGN PATENT DOCUMENTS

| | | |
|---|---|---|
| WO | WO 95/35628 | 12/1995 |
| WO | WO 98/03017 | 1/1998 |

OTHER PUBLICATIONS

M. Hurst and K. Cornog, "MPEG Splicing—Tutorial and Proposed SMPTE Standard," $139^{th}$ SMPTE Technical Conference, New York City, Nov. 1997.

\* cited by examiner

*Primary Examiner*—Nhon Diep
(74) *Attorney, Agent, or Firm*—Barry R. Lipsitz

(57) ABSTRACT

A method is provided for replacing compressed video from a first source with video from a second source at a predefined insertion point in a video data stream. If the video from the second source is progressively refreshed video, it is decompressed sufficiently prior to the insertion point to enable the recovery and recompression of a first video frame (in encoding order) from the second source to be inserted at the insertion point. The recovered first video frame is then recompressed as an intra-coded (I) frame. The insertion of the video from the second source is then commenced at the insertion point using the I frame. The insertion point can, for example, indicate the commencement of a commercial break in the video stream, in which case the second source provides a commercial for insertion into the commercial break. Where the commercial is stored in memory, it can be stored with the first frame thereof (in encoding order) as an I frame.

8 Claims, 1 Drawing Sheet

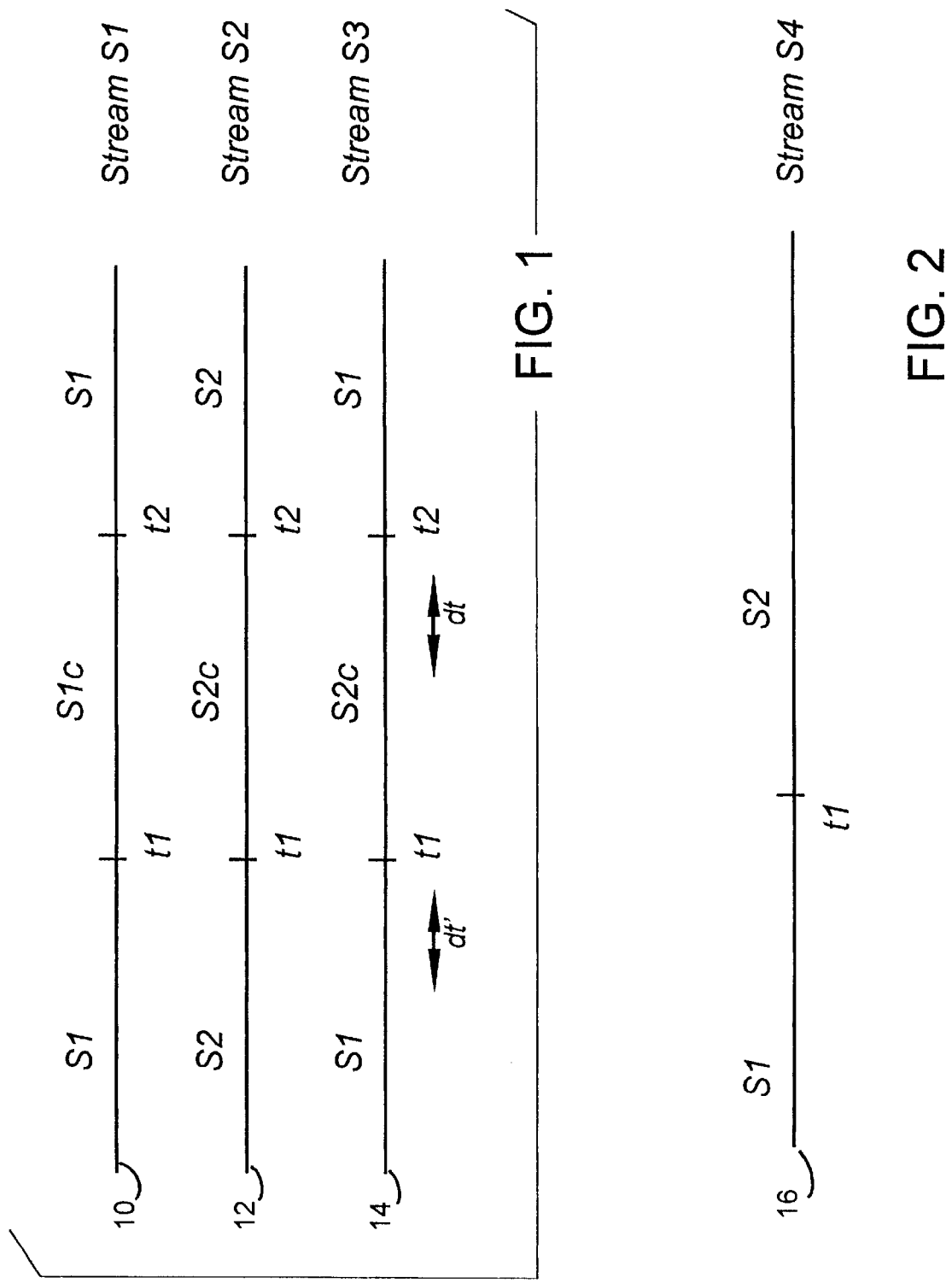

SPLICING OF VIDEO DATA IN PROGRESSIVELY REFRESHED VIDEO STREAMS

BACKGROUND OF THE INVENTION

The present invention relates to digital television, and more particularly to a method for video insertion or stream switching in progressively refreshed video streams.

Commercial insertion, promo insertion, studio routing, camera switching, tape editing, and the like are basic operations in television production and broadcasting. In present day analog systems, switching takes place in the vertical interval of the video signal. With the advent of digital television as implemented, for example, in the Motion Picture Experts Group (MPEG) standards, switching or "splicing" with compressed bitstreams is very complicated. In order to facilitate such operations, the MPEG-2 standard defines "splice points" where point signals (e.g., a commercial) can be substituted for another signal (e.g., a main program) in a video stream.

The Society of Motion Picture and Television Engineers (SMPTE) is currently working on a draft standard for splicing MPEG-2 transport streams. See, for example, Proposed SMPTE Standard PT20.02/010 "Splice Points for MPEG-2 Transport Streams", Second Draft, July 1997, incorporated herein by reference.

There are various reasons why splicing MPEG video is more difficult than switching uncompressed video. In order to explain this, it is necessary to understand some basics about the MPEG transport stream. MPEG gets much of its compression capability by sending only the changes between different video frames. A first type of frame, known as a prediction or "P" frame, is used by the decoder to predict the frame from a previous "P" frame or from an intra-coded "I" frame in the video stream. The stream merely carries "fine tuning" information to correct errors from an approximate prediction. An I frame is compressed without motion prediction. Thus, a full frame can be reconstructed from an I frame without reference to any other frame. In this manner, errors in the prior frame predictions will be eliminated once an I frame arrives and is decoded.

Bidirectional "B" frames are like P frames, except that the prediction is made not only from the previous I or P frame, but also from the next one. For purposes of splicing, this means that while it is possible to leave an old stream after any P or I frame, it is not possible to leave the stream after a B frame since that would cut off the backward prediction reference frame for that B frame. From the point of view of the bitstream, this means that a first video stream may only be left after a P or I frame and all of the B frames (if any) that immediately follow it have passed.

Matters are further complicated when the compressed MPEG bitstream is progressively refreshed. In progressively refreshed streams, such as taught in commonly assigned U.S. Pat. No. 5,057,916 to Krause et al. entitled "Method and Apparatus for Refreshing Motion Compensated Sequential Video Images," sequential video images are refreshed one region at a time. A different region in each of the plurality of video images is communicated without compression during a refresh cycle. In this manner, an image area defined by the region is progressively refreshed by the non-compressed regions during the refresh cycle. Compression of video images may be controlled to prevent data contained in regions not yet refreshed during a current refresh cycle from corrupting data contained in regions that have been refreshed during the current refresh cycle.

For commercial insertion or switching purposes, compressed video from a first source is replaced with compressed video from a second source at a predefined insertion point in the video data stream. If the video from either or both of the first and second source is progressively refreshed, then progressive refresh related artifacts will appear at one or both of the boundaries between the first and second source video.

It would be advantageous to provide a method for providing splicing of progressively refreshed video streams that minimizes noticeable artifacts. The present invention provides such a method.

SUMMARY OF THE INVENTION

In accordance with the present invention, a method is provided for replacing compressed video from a first source with compressed video from a second source, e.g., at a predefined insertion point in a video data stream. A determination is made as to whether the video from the second source is progressively refreshed video. The determination can be a real time determination (e.g., based on testing the second source) or can result from a priori knowledge of the second source. If the video from the second source is progressively refreshed, then it is decompressed sufficiently prior in time to the replacement of the first source video to enable the recovery and recompression of a first replacement video frame from said second source before replacement commences. It is noted that for purposes of present disclosure, the "first replacement video frame" is the first frame in encoding order of the replacement video stream, which may differ from the display order, as well known in the art.

The recovered first video frame is recompressed as an intra-coded (I) frame. Then, insertion of the video from the second source is commenced (e.g., at the predefined insertion point) using the I frame. Since the I frame comprises all of the information necessary to reconstruct a full frame of data and is not progressively refreshed, it enables a clean switch to be made from the video data from the first source to the video data from the second source.

The insertion point can, for example, indicate the commencement of a commercial break in the video stream. In this instance, the second source provides a commercial for insertion into the commercial break. At the conclusion of the commercial break, video from the first source recommences at a second insertion point in the data stream. As with the first splice, it is necessary to determine if the video from the first source is progressively refreshed video. If so, that video is decompressed sufficiently prior to the second insertion point to enable the recovery and recompression of a first video frame (in encoding order) from the first source to be inserted at the second insertion point. The recovered first video frame from the first source is then recompressed to produce an I frame. Insertion of the video from the first source at the second insertion point commences using the I frame produced from the first source.

A method is also provided for replacing compressed video from a first source with substitute progressively refreshed compressed video (e.g., at a predefined insertion point) in a video data stream. The substitute video (e.g., a commercial) is stored with a first frame thereof encoded as an intra-coded (I) frame. The insertion of the substitute video is commenced (e.g., at the predefined insertion point) using the I frame as the first inserted frame. When the compressed video from the first source is progressively refreshed and is to be recommenced at a second insertion point in the data stream following the first insertion point (e.g., at the end of a commercial break) the video from the first source must be processed to prevent progressive refresh related artifacts. In particular, the video from the first source is decompressed sufficiently prior to the second insertion point to enable the recovery and recompression of a first video frame from the first source to be inserted at the second insertion point. The recovered first video frame from the first source is recompressed to produce an I-frame. Insertion of the video from the first source is commenced at the second insertion point using the I frame produced from the first source.

BRIEF DESCRIPTION OF THE DRAWINGS

FIG. 1 is a diagram illustrating first and second data streams S1, S2, respectively, together with a third data stream S3 comprising stream S1 into which a portion of stream S2 has been inserted; and FIG. 2 is a diagram illustrating a data stream S4 created by switching from data stream S1 to data stream S2.

DETAILED DESCRIPTION OF THE INVENTION

The present invention provides a method for inserting commercials or other video segments into progressively refreshed bitstreams and for switching from one bitstream to another when any of the bitstreams is progressively refreshed.

FIG. 1 illustrates a first compressed digital video stream 10 (stream S1). The video stream 10 has a first insertion point t1 at which a commercial break commences. The commercial break terminates at insertion point t2. It is noted that the insertion points may or may not comprise predetermined points in the video stream. Since it is more typical to insert a video segment such as a commercial at a predefined time, it is expected that predetermined insertion points will more often be used with the present invention. However, the use of predetermined insertion points is not required in accordance with the invention. For example, a local television studio may desire to insert a local segment into a main video stream at an arbitrary time, in which case the invention may be implemented without using a predetermined insertion point for the replacement of the main video with the replacement video.

As indicated in FIG. 1, a commercial or other video segment S1c is inserted in the commercial break defined by insertion points t1 and t2. In particular, the inserted video S1c commences at insertion point t1 and terminates at insertion point t2, where the main video program carried by S1. restarts at the termination of the commercial break.

A similar video stream 12 (stream S2) comprises a main program S2 into which a commercial S2c is inserted. It is noted that the commercials S1c and S2c may be part of the streams S1 and S2, respectively, in which case they need not be separately inserted into the main stream. However, in the event that the commercials (or other video segments that are inserted) are stand alone video segments, they must be inserted into the main stream at the appropriate insertion point t1 and terminated at the insertion point t2 when the main stream recommences.

Video stream 14 (stream S3) represents a classic case of video splicing, in which part of stream S1 is replaced by S2c. As indicated above, S2c can be part of stream S2 or may be a stand alone commercial or other stand alone video segment. If S1 and/or S2 are progressively refreshed video data streams, then progressive refresh related artifacts will occur at one or both the boundaries of S1 and S2c. Such refresh related artifacts can last as long as one second or more, depending upon the refresh rate. Thus, when a commercial is switched in and out one would see the artifacts every time the switch is made. To prevent such artifacts while switching the commercial into a main data stream (i.e., splicing out of the main stream and cutting the commercial in), the commercial can be compressed in I, P, B frame mode. However, when the commercial is over and the progressively refreshed main stream is switched back in, the progressive refresh artifacts will still occur. It is noted that the video frames in the stream illustrated in FIG. 1 are in encoding order, which is different from the frame display order. When the frames are encoding order, the first frame of the switched-in segment will be an I frame.

For purposes of the present disclosure, the terms "frame" and "video frame" are used in a generic sense to mean a portion of a video signal or stream from which other portions are reconstructed using, for example, an I-frame, P-frame or B-frame. Thus, although typically a "frame" will be a "full" video frame, it is not intended to limit the meaning thereof to a full video frame for purposes of the present disclosure, since implementations may exist or be developed wherein, e.g., subframe, field, subfield, or other processing is used. With respect to processing of video on a field level instead of a frame level, it should be appreciated that I-fields, P-fields and B-fields may be used. In such cases, these fields are equivalent to and are intended to be covered by the broad terms "frame" and "video frame" as used in the frame processing of video signals.

The present invention overcomes the problem of progressive refresh related artifacts by commencing processing of a frame to be inserted prior to the insertion time. First, the video to be inserted is decompressed sufficiently prior to the insertion point to enable the recovery and recompression of a first frame to be inserted. As noted above, the "first frame to be inserted" is the first frame in the encoding order and not necessarily the first frame in the display order. Once this frame has been decompressed, it is recompressed as an intra-coded (I) frame. Such intra-coded frames are able to be reconstructed without referring to any other frame, and therefore are not subject to progressive refresh. After the recovered first frame is recompressed as an I frame, it is used as the first frame inserted at the insertion point.

As a first example, S1 may be a progressively refreshed compressed video stream whereas S2 is not progressively refreshed. If a sequence is not progressively refreshed then it is I-frame refreshed. In this case, progressive refresh artifacts will occur in switching from S2 to S1, but not while going from S1 to S2. Therefore, a switch can be made from S1 to S2 in order to insert S2c in a conventional manner as is done for I-frame refreshed cases. However, the technique of the present invention must be used to avoid progressive refresh artifacts when switching back from S2c to S1.

In accordance with the invention, when S2c is inserted, decoding of S1 commences at some time dt earlier than the insertion point t2. In other words, decoding of S1 will commence at time (t2-dt). Upon recovery of a first frame (in encoding order) of S1 to be inserted at the termination of S2c, this frame or "picture" is recompressed as all intra-coded blocks, and the recompressed picture is inserted commencing at insertion point t2. The remainder of stream S1 can be the same as the original stream.

In another example, both S1 and S2 are progressively refreshed. In this case, when switching from stream S1 to video segment S2c, decoding of S2c commences at some time dt' earlier than insertion t1, i.e., at (t1-dt'). A recovered first frame (in encoding order) of S2c is recompressed as all I blocks. This first frame is inserted as the first frame of the video segment S2c at insertion point t1. No special processing is required for the remainder of video segment S2c. When switching back from S2c to S1, the same technique used in the previous example is followed; i.e., the first frame (in encoding order) of stream S1 to be inserted at insertion point t2 is recovered and recompressed as all I blocks for insertion at t2.

FIG. 2 illustrates a special case referred to as "switching." In this case, a switch from one stream (e.g., a feed from a first camera) to another stream (e.g., a feed from a second camera) is made. As illustrated in FIG. 2, stream 16 (stream S4) is created by switching S1 to stream S2 at insertion point (or "switching point") t1. In the event that S1 is progressively refreshed but S2 is not, no special processing is required. However, in the case where S2 is progressively refreshed (regardless of whether S1 is progressively refreshed) decoding of S1 will be commenced at a time dt prior to the switching point t1 so that a first frame thereof (in encoding order) can be recompressed as an I frame for use as the first frame when the streams are switched at switching point t1.

The times dt and dt' are established by knowing how many frames it takes to complete the progressive refresh of a picture. For example, if the progressive refresh is completed within fifteen frames, dt and dt' will be a period of time at least equivalent to fifteen frame times, and more typically will be greater than this (e.g., thirty frames) to be certain that enough time is provided to decode and recompress the necessary first frame of the inserted video portion.

It should now be appreciated that the present invention avoids progressive refresh artifacts by starting to decode a main stream, which is progressively refreshed, several frames before an inserted video portion (e.g., a commercial) is over. At the time when the commercial is over, the decoded picture (e.g., P picture) of the main stream is captured and recompressed as an I frame. The main stream is then switched-in commencing with that I frame. The rest of the frames in the main stream can be progressively refreshed frames. It is noted that there may still be some artifacts due to the fact that the I frame is not the true reference frame used to encode the main stream. However, such artifacts are generally significantly less objectionable than the progressive refresh artifacts that would otherwise occur.

In addition, it is also possible to store the commercial or other inserted video segment such that only the first frame of the segment is an I frame and the rest of the frames are progressively refreshed. In this manner, a progressively refreshed commercial can be used without detrimental progressive refreshed artifacts at the time the commercial is switched in to the video stream.

Although the invention has been described in connection with various specific embodiments, it should be appreciated that numerous adaptations and modifications may be made thereto without departing from the scope of the invention as set forth in the claims.

What is claimed is:

1. A method for replacing compressed video from a first source with compressed video from a second source in a video data stream, comprising the steps of:
   determining if the video from said second source is progressively refreshed video, and if so:
   (a) decompressing the video from said second source sufficiently prior to the replacement of the first source video to enable the recovery of a first replacement video frame from said second source before replacement commences;
   (b) recompressing the recovered first replacement video frame as an intra-coded (I) frame; and
   (c) commencing the replacement of the first source video with the second source video using said I frame;
   wherein said first replacement video frame is recovered from said second source by assembling non-motion compensated slices from each of a plurality of progressively refreshed frames, until a full non-motion compensated frame is provided for recompression as said intra-coded (I) frame.

2. A method in accordance with claim 1 wherein the replacement of the first source video with the second source video commences with the insertion of said I frame at a predefined insertion point in said video data stream.

3. A method in accordance with claim 2 wherein said insertion point indicates the commencement of a commercial break in said video stream, and said second source provides a commercial for insertion into said commercial break.

4. A method in accordance with claim 3 wherein at the conclusion of said commercial break, video from said first source recommences at a second insertion point in said data stream, comprising the further steps of:
   determining if the video from said first source is progressively refreshed video, and if so:
   (a) decompressing the video from said first source sufficiently prior to said second insertion point to enable the recovery of a first video frame from said first source to be inserted at said second insertion point;
   (b) recompressing the recovered first video frame from said first source to produce an intra-coded (I) frame; and
   (c) commencing the insertion of the video from said first source at said second insertion point using the I frame produced from said first source.

5. A method for replacing video from a first source with substitute progressively refreshed compressed video in a video data stream, comprising the steps of:
   storing the substitute video with a first frame thereof encoded as an intra-coded (I) frame; and
   commencing the insertion of the substitute video into said video data stream using said I frame as the first inserted frame;
   wherein said first frame is encoded as an intra-coded (I) frame by assembling non-motion compensated slices from each of a plurality of progressively refreshed frames, until a full non-motion compensated frame is provided.

6. A method in accordance with claim 5 wherein the insertion of the substitute video commences with the insertion of said I frame at at predefined insertion point in said video data stream.

7. A method in accordance with claim 6 wherein the compressed video from said first source is progressively refreshed and is to be recommenced at a second insertion point in said data stream following said first insertion point, said method comprising the further steps of:
   (a) decompressing the video from said first source sufficiently prior to said second insertion point to enable the recovery and recompression of a first video frame from said first source to be inserted at said second insertion point;

(b) recompressing the recovered first video frame from said first source to produce an intra-coded (I) frame; and (c) commencing the insertion of the video from said first source at said second insertion point using the I frame produced from said first source.

8. A method in accordance with claim 7 wherein said first and second insertion points define a commercial break in said video stream, and said substitute video is a commercial for insertion into said commercial break.

* * * * *